Figure 1:
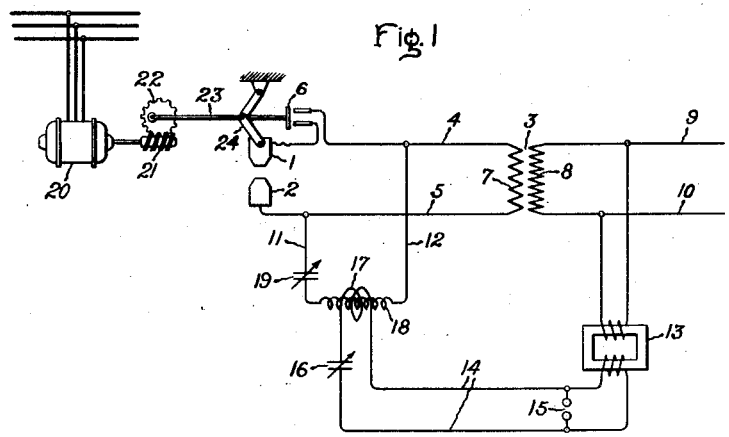

March 21, 1933.  J. A. SEEDE  1,902,469

WELDING APPARATUS

Filed July 22, 1931

Inventor:
John A. Seede,
by Charles E. Tullar.
His Attorney.

Patented Mar. 21, 1933

1,902,469

UNITED STATES PATENT OFFICE

JOHN A. SEEDE, OF SCHENECTADY, NEW YORK, ASSIGNOR TO GENERAL ELECTRIC COMPANY, A CORPORATION OF NEW YORK

WELDING APPARATUS

Application filed July 22, 1931. Serial No. 552,425.

My invention relates to welding, and more particularly to resistance welding.

Resistance welding is that form of electric welding in which the weld is produced by subjecting contacting parts to an application of pressure and heating current through electrodes which engage the exterior surfaces of the parts at the point where it is desired to make the weld. Low voltage sources of supply capable of furnishing large currents are employed for performing the welding operation. If the work parts are covered by thin layers of scale, oil, dirt, or other semi-insulating materials it is often difficult to initiate the flow of welding current and the welding operator may be required to shift the work relative to the welding electrodes or to operate these electrodes into and out of engagement with the work several times in order to locate or produce a low resistance spot through which the current necessary for performing the welding operation may flow. This difficulty arises due to the low voltages employed in this form of welding which may be as low as 1½ volts and which are rarely greater than 12 volts. When higher voltages are employed to minimize the difficulties resulting from the presence of dirt, scale, etc., on the surface of the work parts, it is often necessary to employ reactance or resistance in the welding circuit to limit the flow of welding current. In welding transformers this reactance may be obtained by suitably designing the transformer. However obtained, the presence of resistance or reactance in the welding circuit is undesirable since it increases the first cost of the welding apparatus and results in large operating losses.

The above difficulties are particularly objectionable when the welding operation is to be performed periodically within a predetermined interval of time. Where the welding operation is performed mechanically through the automatic operation of a machine which periodically brings the electrodes into engagement with the work, no welds, or imperfect welds, are often produced, due to the presence of thin layers of scale, oil, or other semi-insulating materials on the work. The same difficulty occurs in line welding machines where the work is fed between roller electrodes and the welding circuit is periodically interrupted or reduced through the agency of switching means included in the welding circuit.

It is an object of my invention to provide means for establishing and stabilizing the flow of welding current through work parts inserted between the welding electrodes of resistance welding machines as soon as the electrodes engage the work irrespective of the condition of the surface of the work parts at the point of welding.

It is a further object of my invention to provide means whereby like welding operations may be performed in practically the same period of time irrespective of variations in the surface condition of the work parts.

Another object of my invention is to provide means for quickly making a resistance weld without damaging the metal surrounding the weld.

A further object of my invention is to decrease the voltage used, thus avoiding the use of current limiting resistances or reactances in the welding circuit and thereby reducing the initial cost as well as the operating expense of resistance welding machines.

These and other objects, which will become apparent from a consideration of my invention, are obtained by supplying to the electrodes an auxiliary source of high voltage, high frequency current. The voltage of the auxiliary source should be 20 volts or more and the frequency should be greater than 200 cycles per second. I prefer to employ voltages of from 50 to 60 volts and frequencies from 300 to 600, although higher voltages and frequencies may be employed without departing from my invention. The high voltage employed readily breaks down the initial resistance to the flow of the welding current resulting from the presence of scale, oil, or other semi-insulating materials on the surface of the work parts and the high frequency of the auxiliary source prevents it from being short-circuited through the welding source which is most generally a low resistance secondary winding of a transformer. The ampere capacity of the auxiliary circuit need not be great since it is not employed to perform the welding operation but as a means for promptly establishing the flow of welding current by means of which the weld is produced.

Figure 2:
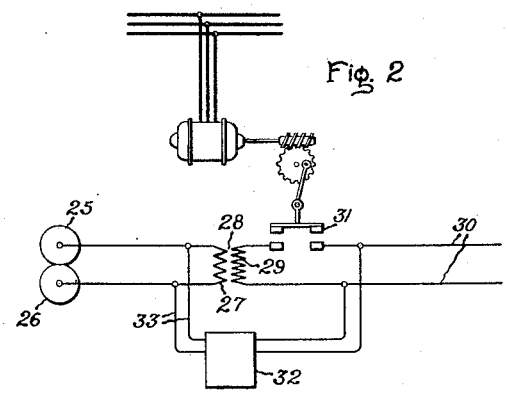

My invention will be better understood from a consideration of the following description taken in connection with the accompanying drawing in which Fig. 1 illustrates the application of my invention to a resistance spot welding machine in which the electrodes are periodically brought into and out of engagement with the work, and in which Fig. 2 illustrates the application of my invention to a line welding machine in which during the welding operation the flow of welding current is periodically reduced or interrupted.

In Fig. 1 the welding electrodes have been indicated at 1 and 2. These electrodes are connected to a source of welding current 3 through conductors 4 and 5 and a switch 6. The source of welding current has been illustrated as a transformer having a primary winding 7 and a secondary winding 8. The primary winding 7 is connected to a source of supply of commercial voltage and frequency through conductors 9 and 10. The voltage of this source will most generally be 110, 220, or 440 volts and the frequency 25 cycles or 60 cycles although commercial sources of supply of different voltage and different frequency may be used.

A source of high voltage, high frequency current is connected to the electrodes 1 and 2 through conductors 11 and 12. The voltage and frequency of this auxiliary source may vary widely and yet be suitable for the accomplishment of the purpose of my invention. The voltage of the auxiliary source should be greater than 20 volts and preferably between 50 and 60 volts. The frequency of the auxiliary source will in a large measure depend upon the nature of the source of welding current since it is necessary to employ a frequency great enough to prevent a substantial amount of its current from flowing through the welding source. Preferably the frequency should be greater than 200 cycles and I prefer to employ frequencies from 300 to 600 cycles, although higher frequencies may be used.

Any suitable form of high frequency generator may be employed. The generating circuit shown in Fig. 1 is connected to supply mains 9 and 10 and includes an auxiliary transformer 13; an oscillating circuit 14 including a spark gap 15, an adjustable condenser 16 and an inductance coil 17; a coil 18 and an adjustable condenser 19. The coils 17 and 18 form the primary and secondary of a high frequency transformer the secondary of which is connected through the adjustable condenser 19 and conductors 5, 11, 12, 4, and switch 6 to electrodes 1 and 2. The frequency of the voltage generated in the high frequency circuit may be adjusted by adjusting the condensers 16 and 19.

The electrodes 1 and 2 are brought into and out of engagement with the work inserted between them through means including a motor 20 which periodically moves electrode 1 to and from stationary electrode 2. This movement is accomplished through a transmission including worm 21, worm wheel 22, connecting rod 23, and linkage 24. Switch 6 included in the welding circuit and in the circuit of the high frequency source is attached to the connecting rod 23 and is operated simultaneously with electrode 1, the arrangement being such that as electrode 1 approaches electrode 2 the switch is closed and as electrode 1 recedes from electrode 2 the switch is opened. This arrangement is provided so as to deenergize electrode 1 when it is separated a predetermined distance from electrode 2, thus preventing the workmen from receiving a shock from the high voltage, high frequency source through this electrode. The other electrode may be grounded.

The operation of this system is as follows: Motor 20 periodically moves the electrode 1 toward and from electrode 2 into and out of engagement with the work inserted between these electrodes. As the work is moved between the electrodes, either manually or automatically, a plurality of spot welds are made due to the flow of welding current through the electrodes 1 and 2. If the work at the point of welding is not clean and the flow of welding current is opposed by the presence of a layer of scale, oil, or other semi-insulating materials, the high voltage, high frequency source of current likewise connected to these electrodes will promptly initiate and stabilize the flow of welding current and permit the welding operation to take place in practically the same time as would be required if the layer of scale, oil, or semi-insulating material were not present. By reason of the high voltage, high frequency source of current the welding operation is at no time delayed and the welding current is applied to all joints for the same length of time, thus producing uniform welds irrespective of the surface condition of the work parts at the points of welding.

In Fig. 2 I have shown my invention applied to a line welding machine in which the flow of welding current is periodically interrupted. The welding electrodes are illustrated at 25 and 26. These electrodes are connected to the secondary 27 of transformer 28, whose primary 29 is connected to a source of supply 30. The connection of transformer 28 to the source of supply 30 is controlled by a motor operated switch 31 which periodically makes and breaks the welding circuit by completing or interrupting primary circuit of the transformer 28. As the work parts are advanced between the electrodes 25 and 26 the periodic interruption of the welding current produces a series of spaced or overlapped spot welds in the work. Thus, in the arrangement shown in Fig. 2, as in Fig. 1, the welding operation is periodically performed and it is essential that the welding operation takes place in practically the same interval of time. In order that the flow of welding current through the work parts shall not be delayed due to the presence of dirt, rust, oil, or other semi-insulating material present on the surfaces of the work parts, the flow of welding current is promptly initiated upon completion of the welding circuit through the agency of a high voltage, high frequency source of current 32 connected through conductors 33 to the electrodes 25 and 26. The source 32 may be the same as that illustrated in Fig. 1, or, an induction coil, or an oscillating circuit including vacuum tubes suitable for generating high voltage, high frequency current, or any other suitable source.

The operation of the system of Fig. 2 is apparent from the above consideration of the operation of the circuit shown in Fig. 1. The high frequency, high voltage source of current connected to the electrodes functions to initiate promptly the flow of welding current through the electrodes as soon as the welding circuit is completed and thus guarantees that the periodic welding operation be performed in practically the same interval time where otherwise it might be delayed resulting in a partial failure of the weld, or no weld at all.

Although my invention has been illustrated as applied to systems in which the welding operation is periodically produced through mechanical means in which the time of welding is limited to a predetermined interval, my invention is likewise applicable to systems in which the welding operation is performed by hand and the time for performing the operation is completely at the disposal of the workmen operating the machine. My invention serves to expedite such welding operations by eliminating the inconvenience heretofore experienced by workmen in attempting to locate a point of low resistance through the parts to be welded and also prevents the necessity of applying the welding current to the work parts for a longer time than necessary which may result in damage to the metal surrounding the weld due to overheating. Thus, while I have illustrated and described two embodiments of my invention it is to be understood that my invention is of general application to all types of resistance welding apparatus.

What I claim as new and desire to secure by Letters Patent of the United States, is:—

1. Resistance welding apparatus comprising a plurality of work engaging electrodes, means for moving said electrodes into and out of engagement with the work to be welded, a source of welding current, means for connecting said source of welding current to said electrodes, and means including an auxiliary source of current for establishing the flow of welding current through said electrodes and said work as soon as said electrodes engage said work.

2. Resistance welding apparatus comprising work engaging electrodes, a low voltage source of welding current of commercial frequency, an auxiliary source of current and means for connecting said sources of current to said electrodes, said auxiliary source of current having a voltage of sufficient magnitude to establish promptly full flow of welding current through work parts included in the welding circuit and a frequency great enough to prevent the flow of a substantial amount of its current through said welding source.

3. Resistance welding apparatus comprising work engaging electrodes, a low voltage source of welding current of commercial frequency, means for periodically interrupting and completing the welding circuit, an auxiliary source of current and means for connecting said sources of current to said electrodes, said auxiliary source of current having a voltage of sufficient magnitude to establish promptly full flow of welding current through work parts included in the welding circuit and a frequency great enough to prevent the flow of a substantial amount of its current through said welding source.

4. Resistance welding apparatus comprising a plurality of work engaging electrodes, means for moving said electrodes into and out of engagement with the work to be welded, a source of welding current, means for connecting said source of current to said electrodes, means including an auxiliary source of current for establishing the flow of welding current through said electrodes and said work as soon as said electrodes engage said work, and means for interrupting the circuit of said auxiliary source when the electrodes have been separated a predetermined distance.

5. Resistance welding apparatus comprising a plurality of work engaging electrodes, means for supplying a relatively large low voltage, low frequency, welding current to said electrodes, and means for supplying a relatively small high voltage, high frequency starting and stabilizing current to said electrodes.

6. Resistance welding apparatus comprising a plurality of work engaging electrodes, means for supplying a large low voltage, low frequency welding current to said electrodes, means for periodically varying the welding current through said electrodes, and means including a source of high voltage, high frequency current for promptly establishing the flow of welding current through said electrodes.

7. Resistance welding apparatus comprising a plurality of work engaging electrodes, a source of welding current having a frequency less than 75 cycles and a voltage less than 12 volts, an auxiliary source of current having a frequency greater than 200 cycles and a voltage greater than 20 volts, and means for connecting said sources of current to said electrodes.

In witness whereof, I have hereunto set my hand.

JOHN A. SEEDE.